D. C. WRIGHT.
ELECTRIC MOTOR SYSTEM.
APPLICATION FILED MAR. 27, 1916.

1,288,787.

Patented Dec. 24, 1918.

INVENTOR
David C. Wright
by F. N. Barber
Att'y.

UNITED STATES PATENT OFFICE.

DAVID C. WRIGHT, OF WICKLIFFE-ON-THE-LAKE, OHIO, ASSIGNOR TO THE ELECTRIC CONTROLLER & MANUFACTURING COMPANY, OF CLEVELAND, OHIO, A CORPORATION OF OHIO.

ELECTRIC MOTOR SYSTEM.

1,288,787.

Specification of Letters Patent.

Patented Dec. 24, 1918.

Application filed March 27, 1916. Serial No. 86,832.

*To all whom it may concern:*

Be it known that I, DAVID C. WRIGHT, a citizen of the United States, residing at Wickliffe-on-the-Lake, in the county of Cuyahoga and State of Ohio, have invented new and useful Improvements in Electric Motor Systems, of which the following is a specification.

This invention relates broadly to electric motor systems, and more particularly to such electric motor systems as contain dynamic braking circuits.

In the operation of motor systems in which the motor is accelerated by a series of contactors which successively short-circuit resistance sections, and use the same resistance sections or some of them for dynamic braking, it sometimes happens, particularly when the master switch is thrown very rapidly from the running position to the dynamic braking position, that the contactors do not function properly and the starting and braking currents are not kept within desirable limits. It is the principal object of this invention to provide means whereby the contacts of a final switch which may be closed at the time the master switch is moved from the running position to the dynamic braking position, will be open-circuited when the master switch is so moved, thereby preventing the establishing of a circuit in parallel with the dynamic braking circuit through the contacts of such switch and the severe arcing on those contacts when they open. Other objects will appear hereinafter.

Figure 1:
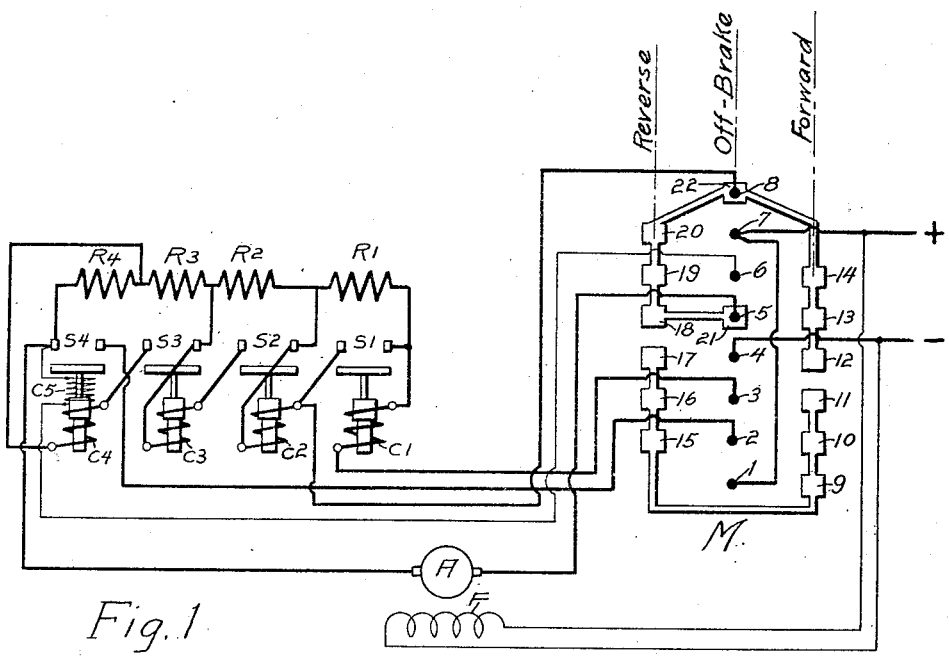
Figure 2:
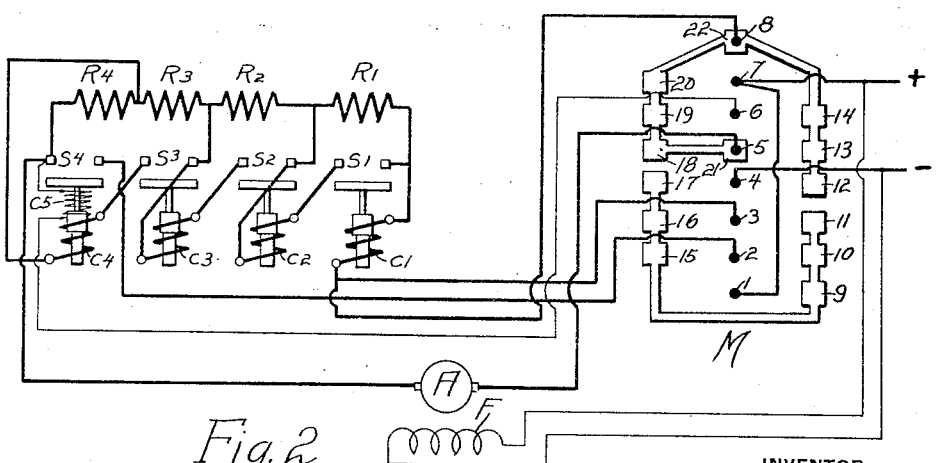

Referring to the accompanying drawing, Figures 1 and 2 are diagrams illustrating two of the many forms of my invention.

Referring first to Fig. 1, A represents the armature of an electric motor and F the shunt field winding thereof. A master controller M, having three operative positions, viz., "forward", "reverse", and "off-brake", connects the motor to a source of supply for forward or reverse running, and disconnects it from the supply and establishes internal connections for stopping the motor by dynamic braking. The starting resistances $R^1$, $R^2$, $R^3$, and $R^4$, controlled by the resistance-controlling switches $S^1$, $S^2$, $S^3$, and $S^4$ are provided for accelerating the motor in starting and for gradually bringing it to rest by dynamic braking when stopping.

Any well-known type of resistance-controlling switch may be used for controlling the resistances, but I prefer to employ electromagnetic switches of the type disclosed in Canfield's application, Serial Number 583,000, filed September 21, 1910, and Eastwood's Patent, No. 1,040,292, issued October 8, 1912, in which the operating windings of the switches are connected in series with the motor, the switches possessing the peculiar characteristic of being locked open when the current in the windings is above a predetermined value, and closing when the current is reduced to that value. In accelerating the motor in either direction the resistance sections $R^1$, $R^2$, $R^3$ and $R^4$ are all connected in series with the motor, and are then successively short-circuited by the closure of the switches $S^1$, $S^2$, $S^3$, and $S^4$. The switches are operated by the windings $C^1$, $C^2$, $C^3$, and $C^4$, and the switch $S^4$ has a shunt holding winding $C^5$ which merely acts to hold the switch closed after it has been closed by its operating winding $C^4$, but is not sufficiently strong to close the switch. For stopping the motor by dynamic braking certain of the resistances are reinserted in series with the armature and short-circuited by the switches as during acceleration of the motor.

The controller M is provided with a set of stationary contacts 1 to 8, and with three sets of movable contacts; one set of forward running contacts 9 to 14, one set of reverse running contacts 15 to 20, and one set of off or brake contacts 21 and 22. Each set of movable contacts may be brought separately into engagement with the set of stationary contacts.

If the master controller M is moved to the forward running position, where the movable set of contacts 9 to 14 engages the stationary set of contacts 1 to 6, respectively, current flows from the positive line marked + through the master controller contacts 7, 1, 9, 11, and 3 to the winding $C^1$ of the switch $S^1$, all the starting resistance sections $R^1$, $R^2$, $R^3$, and $R^4$ in series, the armature A, and the master controller contacts 5, 13, 12, and 4 to the negative line marked —. The current in this circuit starts the motor and locks the switch $S^1$ open. When the motor current falls to the operating point for which the switch $S^1$ is set, it closes and short-circuits the resistance section $R^1$, and connects the operating winding $C^2$ of the switch $S^2$ in series with the winding $C^1$ and the contacts of the switch $S^1$. The rush of current due to the cutting out of the resistance section $R^1$ locks the switch $S^2$ open until further acceleration of the motor causes the current to fall to the operating point for which the switch $S^2$ is set, whereupon it closes and short-circuits the section $R^2$ of the resistance, and connects the winding $C^3$ of the switch $S^3$ in series with the windings $C^1$ and $C^2$ and the contacts of the switches $S^1$ and $S^2$. The rush of current due to the cutting out of the resistance section $R^2$ locks the switch $S^3$ open. When the current has again fallen, the switch $S^3$ closes and short-circuits the resistance section $R^3$ and another rush of current ensues. Finally, when the current has again fallen, due to the further speeding up of the motor to the operating point for which the switch $S^4$ is set, it closes and short-circuits the section of resistance $R^4$, and also short-circuits its own winding $C^4$ and the windings $C^1$, $C^2$, and $C^3$ of the switches $S^1$, $S^2$, and $S^3$ by establishing a new circuit through the master switch from the positive line through the contacts 7, 1, 9, 10, and 2, and the contacts of the switch $S^4$, the motor armature A, the contacts 5, 13, 12, and 4 to the negative line. The closure of the switch $S^4$ by connecting its contacts directly to the positive line as above described, connects the holding winding $C^5$ directly to the positive line through the contacts of the switch $S^4$, the current flowing from the positive line through the winding $C^5$, and the contacts 6, 14, 12, and 4, to the negative line. The current in the winding $C^5$ holds the switch $S^4$ closed, which short-circuits the windings of the switches $S^1$, $S^2$, and $S^3$, which immediately open.

If, however, the master controller M is moved to the reverse running position, so that the movable set of contacts 15 to 20 engages corresponding contacts of the stationary set 2 to 7 circuits will be established to cause the direction of the flow of current through the resistance sections and the switches and the armature to be reversed, whereupon the motor rotates in the reverse direction, as is readily apparent from the drawing.

If the master controller is moved from either the forward or reverse positions to the off, or brake, position, the motor system will be disconnected from the source of supply except as to the field winding F, and a dynamic braking circuit for the motor will be established, the motor acting as a generator with a closed path from one side of the armature A, through the contacts 5, 21, 18, 22, and 8, the winding $C^2$ of the switch $S^2$, the resistance sections $R^2$, $R^3$, and $R^4$ in series, and back to the other side of the armature A. It will be noted that the first section $R^1$ is not included in this circuit. The current in the latter circuit locks the switch $S^2$ open. When the current falls, due to the slowing down of the motor to the operating point for which the switch $S^2$ is set, it closes and short-circuits the resistance section $R^2$ and connects the winding $C^3$ of the switch $S^3$ in series with the winding $C^2$ and the contacts of the switch $S^2$, thereby locking open the switch $S^3$. When the current again falls to the operating point of the switch $S^3$ it closes and short-circuits the resistance section $R^3$ and connects the winding $C^4$ of the switch $S^4$ in series with the windings $C^2$ and $C^3$ and the contacts of the switches $S^2$ and $S^3$, and locks the switch $S^4$ open. When the current again falls to the operating point for which the switch $S^4$ is set, this switch closes, but the path of the current does not change because one of the contacts of the switch $S^4$ is open on the master controller at 2. Therefore, on the closure of the switch $S^4$ the resistance section $R^4$ remains in the dynamic braking circuit. The winding $C^1$ of the switch $S^1$ and the holding winding $C^5$ of the switch $S^4$ are not energized, their circuits being open respectively at 3 and 6 on the master controller M. As the motor slows down, the dynamic braking current becomes so small that the switches $S^2$, $S^3$, and $S^4$ fall open.

During the acceleration of the motor the four resistance sections are all connected in series with the motor and then successively short-circuited; while for dynamic braking, the sections $R^2$, $R^3$, and $R^4$ only are connected in circuit with the motor and of these the sections $R^2$ and $R^3$ only are short circuited.

It has been common practice to employ all of the accelerating switches for dynamic braking, which is unsatisfactory because the current requirements of starting and braking are different. In such practice it has been essential that the master switch be moved from the running to the braking position, or from the forward to the reverse position through the braking position, slowly so that the final accelerating switch shall have time to open before the master switch reaches the braking position; otherwise, all of the braking resistance would be short-circuited permanently by the final switch, and the motor might be injured by a rush of excessive braking current, or, at best, the final switch would open late and draw a destructive arc on its contacts. By controlling the dynamic braking resistance as described, I obtain satisfactory braking current, reduce the tendency to spark or flash on the motor brushes, eliminate the danger of a current overload on the motor, and bring the motor to rest in a safe and efficient manner. By causing all of the switches but the last to be open prior to dynamic braking, and by opening the circuit of the contacts of the final switch on moving the master switch to the dynamic braking position, I make certain that the dynamic braking resistance is all inserted in the motor circuit when the master switch is moved to or through the braking position, no matter how rapidly it may be moved.

In special applications in which the requirements of dynamic braking current approach more nearly to those of starting current, I find it advisable to employ all of the starting resistance for dynamic braking purposes. In Fig. 2 I show a diagram of a system, so employing the starting resistance. When the master switch in Fig. 2 is thrown to the off or brake position, the dynamic braking circuit for the motor is established from the armature A through the contacts 5, 21, 18, 22, and 8, the winding $C^1$ of the switch $S^1$, the resistance sections $R^1$, $R^2$, $R^3$, and $R^4$ in series, and back to the armature A. The resistance section $R^1$, as well as the sections $R^2$, $R^3$, and $R^4$, is now included in the circuit. The current in this circuit locks open the switch $S^1$, and when the current falls due to the slowing down of the motor to the operating point for which the switch $S^1$ is set, this switch closes, short-circuits the resistance section $R^1$, and connects the winding $C^2$ of the switch $S^2$ in series with the winding $C^1$ and the contact of the switch $S^1$, causing the switch $S^2$ to be locked open. The remainder of the braking operation is the same as that described in connection with Fig. 1. The resistance sections $R^1$, $R^2$, $R^3$, and $R^4$ are connected in series for dynamic braking, and the sections $R^1$, $R^2$ and $R^3$ successively cut out, $R^4$ being left in the circuit by the opening of the circuit of the contacts of the switch $S^4$ at the master switch M, all as is readily understood.

I have illustrated my invention in connection with a reversing master switch, but it will be understood that the invention may be practised with a non-reversing master switch; that any number and any suitable form of resistance switches and any suitable form of master switch may be employed in the practice of my invention, and I do not, therefore, wish to be limited to the forms which I have illustrated.

I claim—

1. In a motor system, an electric motor, a circuit therefor, resistance sections in the circuit, switches operated in sequence for successively short-circuiting the resistance sections, means for connecting the armature and some of the resistance in a dynamic braking circuit, and means whereby, when the armature of the motor and any of the said resistance sections are connected in a dynamic braking circuit, the circuit through the contacts of the final switch is open though the said contacts are closed.

2. In a motor system, a motor, a circuit therefor, resistance sections in the circuit, switches operated in sequence for successively short-circuiting the resistance sections, means for connecting the armature of the motor and some of the resistance sections in a dynamic braking circuit, and means whereby, when the dynamic braking connections are established, the circuit through the contacts of the final switch is open though the said contacts are closed.

3. In a motor system, a circuit therefor, resistance sections, electro-magnetic switches operated in sequence for short-circuiting the resistance sections successively, and means for connecting the motor and all of the resistance sections in the circuit to start the motor and accelerate it to normal speed, and for connecting the armature and certain of the said resistance sections in a dynamic braking circuit and simultaneously opening the circuit through the contacts of the final switch though the said contacts are closed.

4. In a control-system for electric motors, an electric motor, a circuit therefor, sections of resistance in the circuit, successively-operating electro-magnetic switches for successively cutting out the sections of resistance from the circuit, means for including certain sections of the resistance, including the final section, in a dynamic braking circuit, and means for retaining the final section of dynamic-braking resistance in the braking circuit when the final switch closes.

5. In a motor control system, a motor, a motor circuit, a resistance in said circuit, a plurality of switches for starting the motor and for stopping it by dynamic braking, all of said switches being arranged in the circuit to close successively and start the motor by reducing the said resistance in said circuit and some of the switches being arranged to close successively and stop the motor by reducing the said resistance in said circuit, and means whereby the circuit through the contacts of the final switch are out of electrical connection with one terminal of the motor during the stopping of the motor whereby the closure of the final switch does not reduce the resistance in the circuit.

6. In a motor control system, a motor, a motor circuit, a resistance in the circuit, a plurality of electro-magnetic switches for starting the motor and for stopping it by dynamic braking, arranged to be closed by the armature current of the motor, the contacts of all the switches being arranged in the circuit to start the motor by reducing the said resistance, and the contacts of some of the switches being arranged in the motor circuit to stop the motor by reducing the said resistance, and means for disconnecting the contacts of the final switch from one terminal of the motor.

7. In a motor control system, a motor, a motor circuit, a resistance in said circuit, a plurality of switches for starting the motor and for stopping it by dynamic braking, all of said switches being arranged in the circuit to start the motor by reducing the amount of resistance in said circuit and some of the switches being arranged to stop the motor, and means whereby the contacts of the last switch to close during dynamic braking are always open-circuited during dynamic braking.

8. In a motor control system, a motor, a starting circuit and a dynamic braking circuit therefor, a master for selectively establishing said circuits, a resistance, a plurality of switches arranged to close successively, each of said switches on closing reducing the amount of resistance in said circuit to start the motor, and two or more of said switches being arranged to close successively for dynamic braking, and means whereby, when the last switch closes during dynamic braking, its contacts are open-circuited on the master.

Signed at Cleveland Ohio this 23rd day of March, A. D. 1916.

DAVID C. WRIGHT.

Copies of this patent may be obtained for five cents each, by addressing the "Commissioner of Patents, Washington, D. C."